United States Patent [19]

Downey et al.

[11] Patent Number: 5,701,240
[45] Date of Patent: Dec. 23, 1997

[54] APPARATUS FOR POWERING A TRANSMITTER FROM A SWITCHED LEG

[75] Inventors: Walter J. Downey, Los Gatos; Philip H. Sutterlin, Saratoga; J. Marcus Stewart, San Jose; Amy O. Hurlbut, San Francisco, all of Calif.

[73] Assignee: Echelon Corporation, Palo Alto, Calif.

[21] Appl. No.: 649,163

[22] Filed: May 17, 1996

Related U.S. Application Data

[63] Continuation-in-part of Ser. No. 610,831, Mar. 5, 1996.

[51] Int. Cl.$^6$ .................................. H02J 3/36; H04B 5/02
[52] U.S. Cl. .................................. 363/35; 375/219
[58] Field of Search .......................... 363/35, 125, 123, 363/84; 323/282; 370/84, 44, 51, 52; 375/219, 220, 295, 310

[56] References Cited

U.S. PATENT DOCUMENTS

| | | | |
|---|---|---|---|
| 4,713,598 | 12/1987 | Smith | 323/245 |
| 4,821,166 | 4/1989 | Albach | 363/89 |
| 4,918,690 | 4/1990 | Markkula, Jr. et al. | 370/94 |
| 4,962,354 | 10/1990 | Visser et al. | 323/360 |
| 5,018,138 | 5/1991 | Twitty et al. | 370/94.1 |
| 5,182,746 | 1/1993 | Hurlburt et al. | 370/100.1 |
| 5,347,549 | 9/1994 | Baumann et al. | 375/117 |
| 5,454,008 | 9/1995 | Baumann et al. | 375/369 |
| 5,548,614 | 8/1996 | Stoll et al. | 375/211 |

*Primary Examiner*—Adolf Berhane
*Attorney, Agent, or Firm*—Blakely, Sokoloff, Taylor & Zafman

[57] ABSTRACT

A power supply for operating from a switched leg of an AC power line and for powering a transmitter is described. A switch provides current during the beginning of each AC half cycle to an inductor and charges a capacitor. When the switch is open, the inductor continues to charge the capacitor. During the time that the inductor is coupled to that AC line, the switched leg is open. For instance, the signal used to close the switch also prevents a triac in the switched leg from conducting. When the voltage on the capacitor drops to a predetermined level transmission from the transmitter is inhibited. A timing circuit is used to determine when to begin transmissions to compensate for variables in the node such as line voltages and part tolerances.

5 Claims, 8 Drawing Sheets

APPARATUS FOR POWERING A TRANSMITTER FROM A SWITCHED LEG

RELATED APPLICATIONS

This continuation-in-part application is related to co-pending application Ser. No. 08/610,831, filed Mar. 5, 1996, entitled "Capacitor Power Supply For Intermittent Transmission", and Ser. No. 08/649,514, filed May 17, 1996, entitled "Switched Leg Power Supply". Both applications are assigned to the Assignee of the present invention.

BACKGROUND OF THE INVENTION

1. Field of the Invention

The invention relates to the field of power supplies for communication transmitters.

2. Prior Art

In a network used for sensing and controlling such as described in U.S. Pat. No. 5,018,138 a plurality of nodes each having a cell and transceiver communicate over a medium such as a power line. Each node requires a DC power supply to power the integrated circuits in the node. This power is conveniently obtained from the power line where the power line is the medium over which communications occur. The power supply typically represents a significant portion of the cost of a node.

Generally the DC power supplies for the nodes are large enough to support continuous transmission by the transceivers. The power supply current needed for transmission may be as much as 10 times the current required for receiving. Thus for practical purposes, the power supply is sized to supply sufficient current for transmitting plus whatever other current is required by the node. This is true even though transmissions from the nodes are intermittent (e.g., occasional transmission of 50–75 msec data packets).

As will be seen the present invention enables the use of a DC power supply which provides substantially less continuous current than consumed by an active transmitter, resulting in significant cost savings.

Often in circuits designed to deliver power to, for instance, an incandescent light bulb, a single pole switch is used to complete or interrupt a circuit. Generally, the switch is located remotely from the light bulb with only one of the "hot" power line or neutral line routed to the switch. That is, the switch is mounted apart from a point where both the neutral line and the "hot" line are available without the bulb in one of the lines. This arrangement is referred to as a switched leg. This switched leg is typically adequate except where it is necessary to provide power at the switch itself. When power is required at the switch, current must be drawn through the light bulb to obtain this power. If the switch is in the off position, the current drawn through the bulb may cause the bulb to appear be lighted especially where the bulb is in a dark background.

A circuit for providing power in a switched leg is described in U.S. Pat. No. 4,713,598.

SUMMARY OF THE INVENTION

A method for operating a transmitter which receives power from a DC power supply and a capacitor, where the DC power supply is powered from a switched leg and where the power supply charges the capacitor to a maximum potential of Vmax is disclosed. First, transmissions by the transmitter are inhibited when the potential on the capacitor drops to a first predetermined potential (Vmin). This causes the capacitor to recharge from the DC power supply. The time at which the potential on the capacitor reaches a second predetermined potential which is higher than Vmin but less than Vmax is noted. Transmission is then permitted after waiting an additional period of time following the detection of the second potential on the capacitor. The capacitor is periodically coupled to the switched leg to receive charge. When this occurs, current in the switched leg is inhibited.

Other aspects of the present invention are described in the detailed description of the present invention.

DETAILED DESCRIPTION OF THE PRESENT INVENTION

A method and apparatus for providing power for a transmitter is disclosed where the transmitter is not required to transmit continuously and where power is obtained from a switched leg. In the following description numerous specific details are set forth, such as specific voltages, duty cycles, etc., in order to provide a thorough understanding of the present invention. It will be apparent that the present invention may be practiced without these specific details. In other instances, well-known components such as regulators flip-flops are not shown in detail in order not to obscure the present invention.

OVERALL SYSTEM OF FIG. 1

Figure 1:
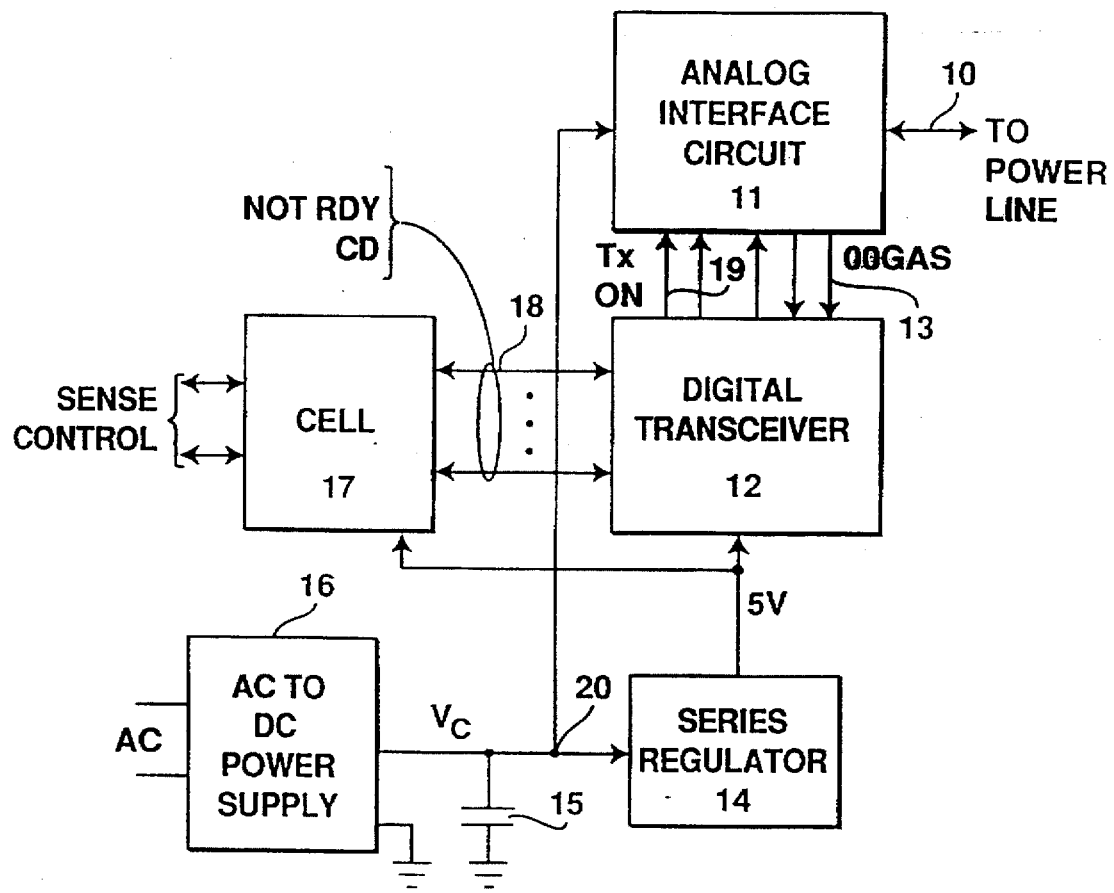
FIG. 1 is a block diagram showing a node in a network which incorporates the improvement of the present invention.
Figure 8:
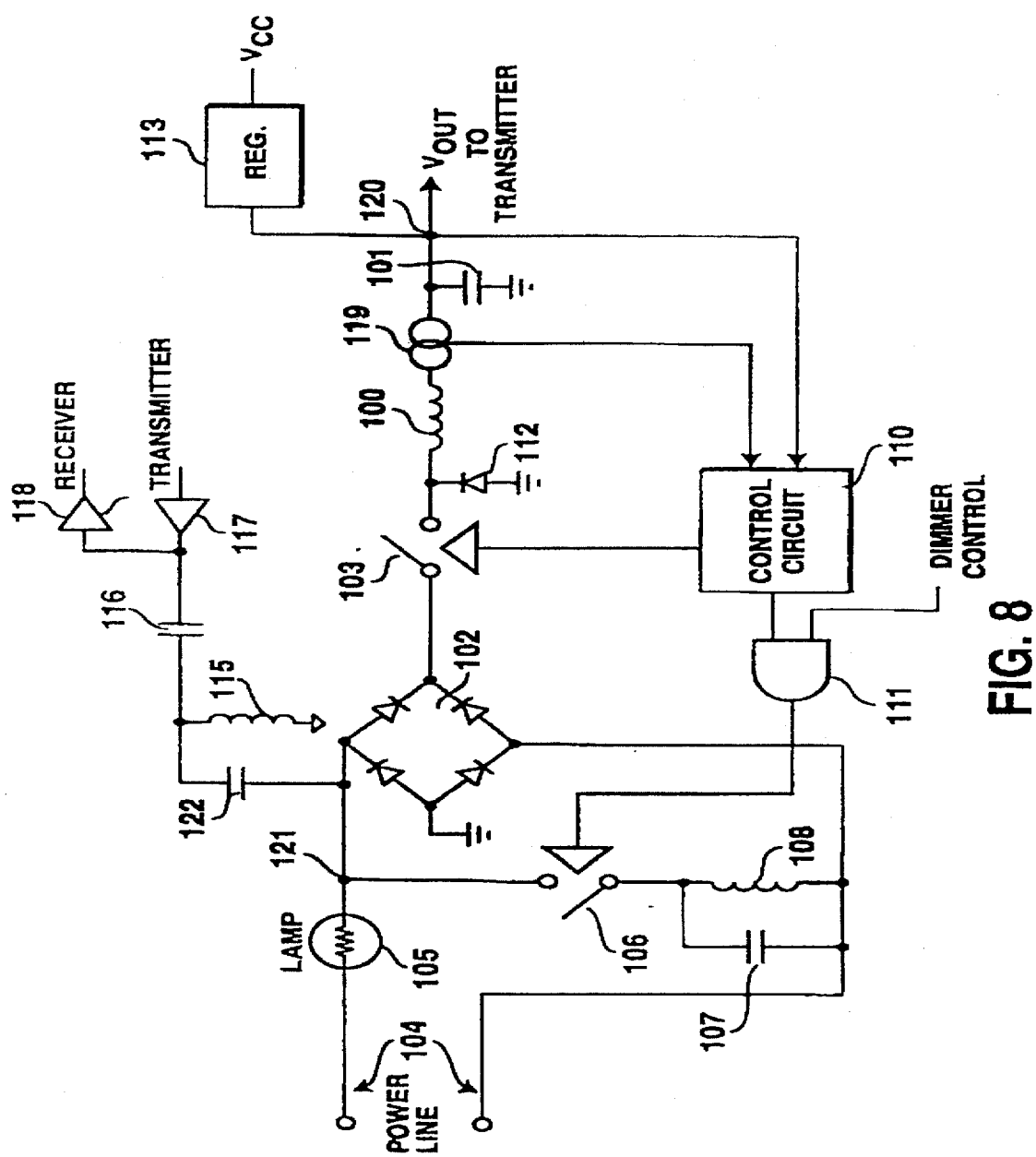
FIG. 8 is a block diagram/schematic illustrating the power supply of the present invention.
Figure 9:
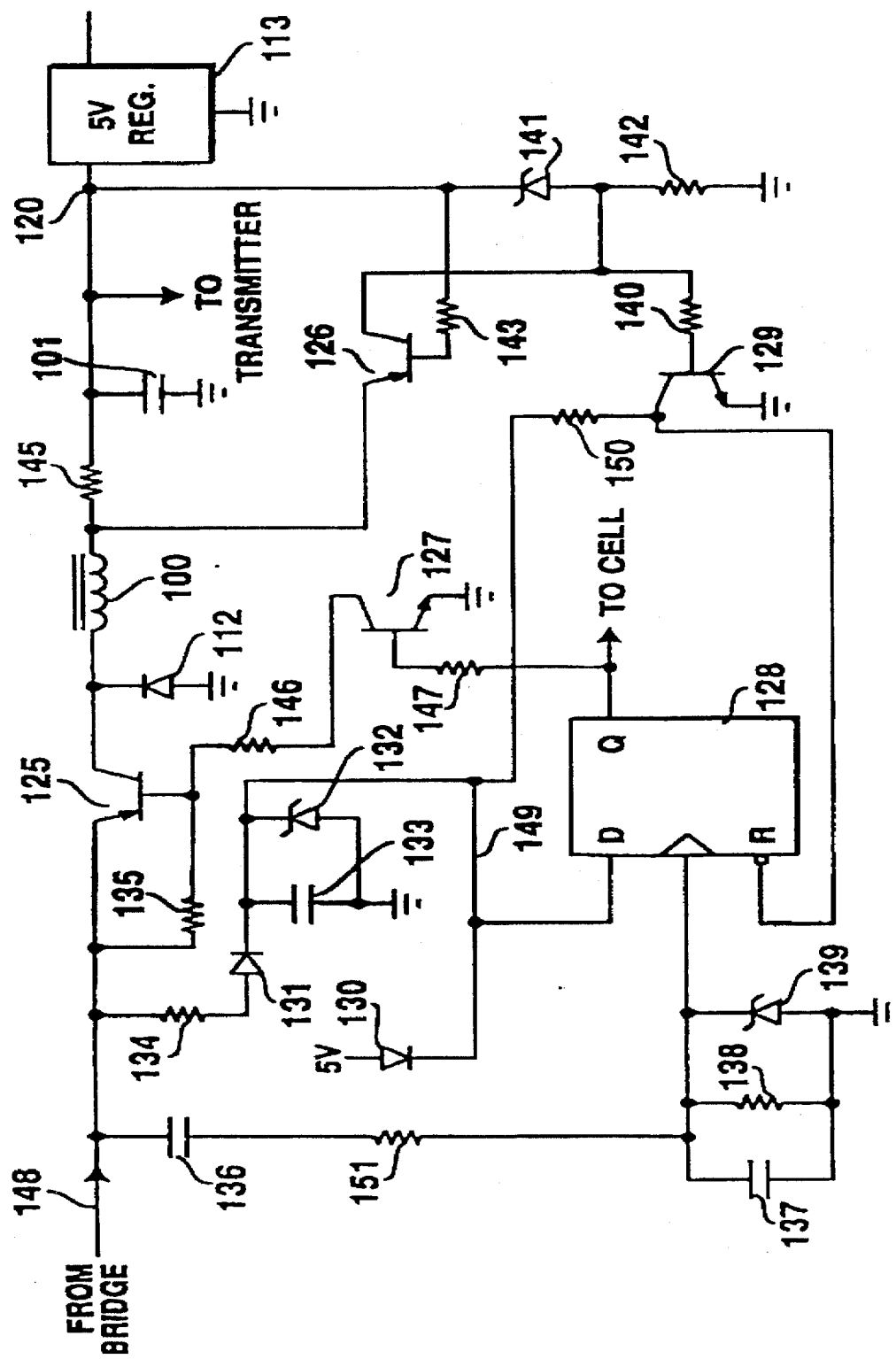
FIG. 9 is an electrical schematic of one embodiment of the present invention.

In FIG. 1, a node comprising a cell 17, digital transceiver 12, analog interface circuit 11, and power supply 16 is illustrated. A power supply for operating from a switched leg is shown in FIGS. 8 and 9. The analog interface circuit 11 drives data packets onto a power line via lines 10. The analog interface circuit 11 in one embodiment comprises an integrated circuit which receives digital signals from the digital transceiver 12 and provides an appropriate analog signal for driving data packets onto the power line. Additionally, signals from the power line are coupled through the analog interface circuit 11 to the digital transceiver unit 12 when data packets are received from the power line. The digital transceiver 12, in addition to communicating with interface circuit 11, communicates with a cell 17. Cell 17, by way of example, senses the state of a switch, controls a switch or performs other sensing and control functions. The cell 17 both receives signals from transceiver 12 and provides signals to transceiver 12. Both transceiver 12 and cell 17 are preferably integrated circuits. In one embodiment, the cell may be a Motorola part no. MC3150. A cell for use in FIG. 1 is also described in U.S. Pat. No. 5,018,138.

An interface for providing signals between the cell 17 and the transceiver 12 is described in U.S. Pat. No. 5,182,746. Two signals which are transmitted between the cell and transceiver 12 over the lines 18 and which are referred to below are a "NOT RDY" indication sent by transceiver 12 to cell 17 and a collision detect (CD) indication also sent by the transceiver 12 to the cell 17. NOT RDY informs the cell 17 that the transceiver 12 is not ready to transmit onto the power line. The collision detect signal informs the cell 17 that the packet transmission has been aborted before completion. This informs the cell that it should resend data to transceiver 12 for retransmission onto the power line (via interface circuit 11). The interface circuit 11 and transceiver 12 may be commercially available integrated circuits except for specific additional functions which they perform in accordance with the present invention and which are described below and shown in FIG. 2. These additional functions may be implemented "on chip" using well-known circuits as will be apparent from FIG. 2.

In practice, the cell 17 senses or controls and communicates with other nodes through the circuits 11 and 12. Thus, data packets originating in the cell 17 are first communicated to transceiver 12 and prepared for transmission before being coupled to interface circuit 11. Likewise, data packets from the power line are coupled via the interface circuit 11 to transceiver 12 where signal processing and other digital processing takes place. The interface circuit 11 is primarily an analog driver/receiver circuit for coupling signals to and receiving signals from the power line.

Two signals which are communicated between transceiver 12 and interface circuit 11 for use in the present invention are the TXON signal transmitted over line 19 and the "out of gas" (OOGAS) signal transmitted on line 13. The TXON signal which is transmitted from transceiver 12 to interface circuit 11, controls when the transmit drive amplifier of interface circuit 11 is active. When this signal is inactive (low) transmission is inhibited. If this signal goes low during a transmission, the transmission is immediately halted. The OOGAS signal which is transmitted from interface circuit 11 to transceiver 12 on line 13 becomes active (high) when the power supply potential applied to interface circuit 11 from line 20 (Vc) has fallen to a first predetermined potential (Vmin). This potential is the lowest potential at which the interface circuit 11 and series regulator 14 are able to function as intended. OOGAS returns to its inactive state when Vc rises to a second predetermined potential.

Power for the node of FIG. 1 is provided from the AC power line which in this example is also the medium for the transmission of data packets between nodes. The AC power is converted to DC power by the AC-to-DC power supply 16. The DC output from supply 16 is coupled to a series regulator 14 which provides, by way of example, a regulated 5 volts for the transceiver 12 and the cell 17. A capacitor 15, which receives charge directly from the power supply 16, stores energy for the regulator 14 and for the analog interface circuit 11. In one embodiment the capacitor 15 is 3,000 µF (16V). Thus interface circuit 11 is directly powered from the output of the power supply 16 and from the capacitor 15.

OVERVIEW OF FIG. 1

The operation of the present invention, less the DC power supply, is perhaps best understood when referring to an example. Assume that the power supply 16 must supply 30 mA of current to the regulator 14 for operating transceiver 12 and cell 17. Also, assume that analog interface circuit 11 requires 250 mA for transmission. (The amount of current required by interface circuit 11 for receiving signals from the power line is only a few mA and can be ignored for purposes of discussion here.) On first examination it would appear that the power supply 16 must provide the sum of 250 mA and 30 mA, that is, 280 mA. With the present invention the power supply 16 may, for example, provide only 70 mA; 30 mA for the regulator 14 which powers the transceiver 12 and cell 17 and the remaining 40 mA for charging the capacitor 15 while no transmissions are occurring.

For the network under discussion, the interface circuit only randomly transmits packets and consequently does not continuously require 280 mA. The capacitor 15 is charged to the upper output potential (Vmax) of the power supply 16 (e.g., 15 volts) which potential is applied to interface circuit 11. Since data packets of only 50–75 msecs duration are typically transmitted by the transceiver, the capacitor 15 provides ample energy for transmitting at least one such packet before the voltage on capacitor 15 drops to Vmin.

If a plurality of packets are closely spaced in time, the voltage on capacitor 15 may drop to the predetermined potential (Vmin). Interface circuit 11 senses the drop in potential to Vmin and in response provides the OOGAS signal on line 13 to the digital transceiver 12. Transceiver 12, in turn, causes the signal TXON on line 19 to go inactive (thereby halting any transmission in progress) and temporarily prevents further transmissions. Additionally, when OOGAS becomes active, transceiver 12 indicates to cell 17 that a "collision" has been detected. While a collision with other data on the power line did not actually occur, the result (i.e., interrupted packet transmission) and the desired action of retransmission of the disturbed packet are the same as if a collision had occurred. Thus the collision detect signal may be used to cause cell 17 to schedule a retransmission of the last (interrupted) packet.

Once the interface circuit 11 ceases transmitting, 40 mA from the power supply 16 are available to recharge capacitor 15 for the example used above. When capacitor 15 reaches a second predetermined potential the OOGAS signal goes inactive and then, in the preferred embodiment, transmissions are enabled again after a period of time which is a function of the time for which OOGAS was high. The second predetermined potential is less than Vmax and more than Vmin. In one embodiment the second predetermined voltage lies about ½ way between these values.

Thus as can be seen for the previous example, the power supply 16 provides approximately ¼ the power needed for sustaining continuous transmissions from interface circuit 11, transceiver 12 and cell 17. This substantially reduces the cost of power supply 16 and consequently the cost of equipping a node as shown in FIG. 1.

As will be discussed in more detail below, it is not always easy to determine when to enable transmissions once Vc drops to Vmin and then rises. There are a number of variables, such as the maximum output current of the DC power supply, which typically is a function of the input AC voltage. Additionally, the capacitor 15 may have a tolerance of ±20% and the current drawn by the interface circuit 11 is a function of the impedance of the power line as seen by the interface circuit 11. These and other variables make it less than optimal to, for instance, enable transmissions after simply waiting a fixed period of time.

If a fixed time delay were chosen which was long enough to ensure full recharge under worst case conditions, then transmissions would be held off for unnecessarily long periods when more common typical conditions exist. On the other hand, if a shorter fixed delay were chosen then under worst case conditions the capacitor 15 would not recharge sufficiently to allow transmission of even one complete packet.

The significance of this matter is magnified by the fact that the current from power supply 16 used to recharge capacitor 15 is only a fraction of the current capacity of supply 16. In the earlier example, 40 mA of the power supply's 70 mA capacity was available for recharging capacitor 15. If the output capacity of supply 16 drops 10% to 63 mA (e.g., due to low AC line voltage or internal component tolerances) then the current available to recharge capacitor 15 decreases to 33 mA—a drop of 18%. This translates into 18% more time to recharge capacitor 15.

A similar multiplicitive increase in recharge time occurs for a given percentage increase in transceiver 12 and cell 17 current consumption (due, for example, to tolerances in the manufacture of cell 17 and transceiver 12).

A second non-optimal method for determining when to enable transmission after Vc drops and then rises is to simply measure when capacitor 15 is essentially at full charge. If the measured value chosen for "full charge" is too high then a supply with its upper output voltage on the lower tolerance end may never be allowed to transmit. On the other hand, if the measured value chosen for "full charge" is lower to account for measurement and supply tolerances then transmission may be enabled prior to capacitor 15 being fully charged.

Thus, one of the purposes of the present invention is to provide a more optimal method for determining when to enable transmissions following power supply output voltage drop.

Figure 7:
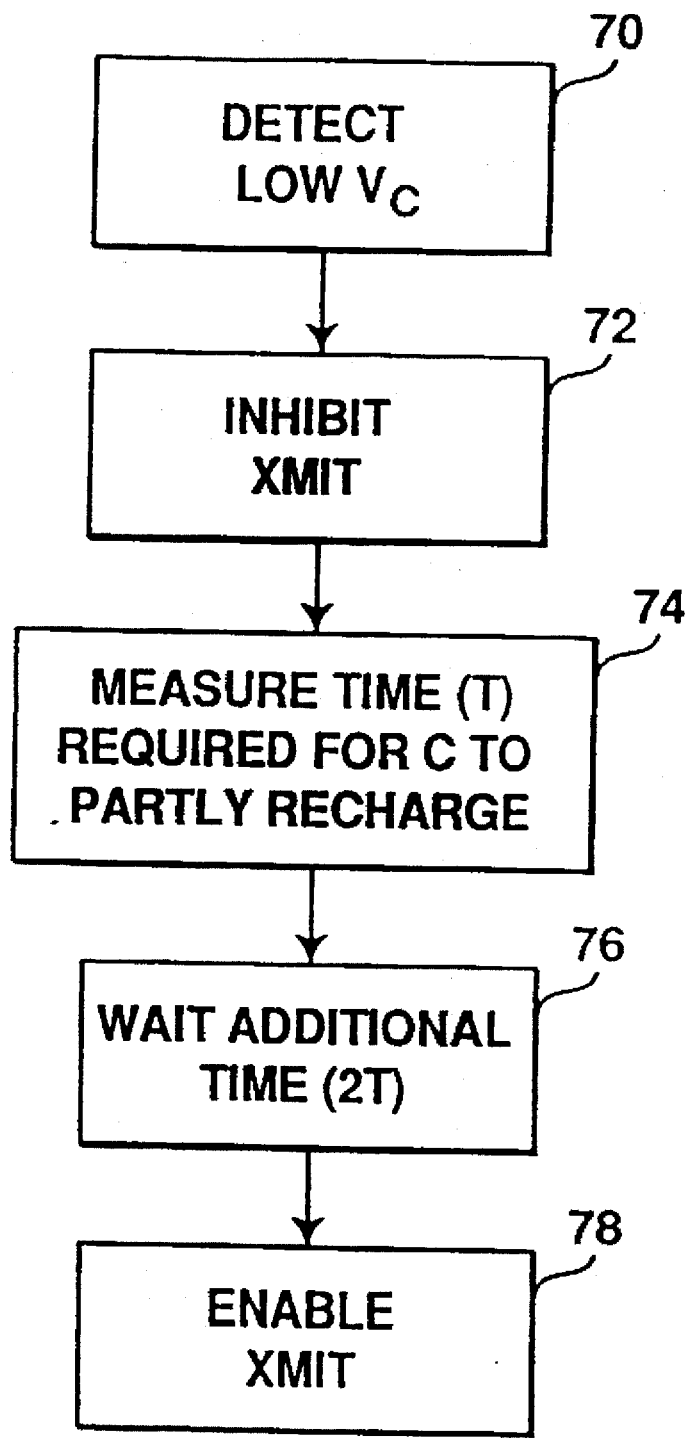
FIG. 7 illustrates a series of steps implemented by the present invention.

In FIG. 7 the steps implemented by the present invention, less those associated with the DC power supply, are shown as steps 70–78. These steps ensure that the analog interface circuit 11, series regulator 14 (and thus transceiver 12 and cell 17) have sufficient voltage for proper operation.

First, as shown by step 70 the voltage on the capacitor 15 is detected and, in particular, a predetermined voltage which in one embodiment is the minimum voltage at which the interface circuit 11 will operate (Vmin) is detected. By way of example, assume that the maximum DC output voltage from the power supply 16 is 16 volts, this occurring when the AC voltage is at its upper extreme, and that the interface circuit 11 will operate satisfactorily with a voltage as low as 8 volts (Vmin=8 volts). For purposes of discussion it is assumed that the receiving circuitry of the interface circuit 11 as well as regulator 14 operates satisfactorily at a voltage of 8 volts or higher.

Once Vmin is detected as shown by step 70, then as shown by step 72 transmission is inhibited: that is, for the node of FIG. 1, interface circuit 11 is prevented from transmitting onto the power line. Once this occurs the capacitor 15 of FIG. 1 begins to recharge since the current output of the supply 16 is greater than the power consumed by the regulator, transceiver 12, cell 17 and the power needed by interface circuit 11 in the receive mode.

As shown by step 74 the time (T) required for the capacitor 15 of FIG. 1 to partly recharge is measured. For the example under discussion the time for the capacitor 15 to charge from 8 volts to 12 volts is measured. Then as shown by step 76, an additional period of time is allowed to lapse before transmission from the interface circuit 11 is permitted. In one embodiment this period of time is equal to 2T where T is the period measured in step 74. This additional period of time (2T) gives the capacitor 15 additional time to charge to its maximum value (Vmax).

As shown by step 78 after the passage of time of step 76, transmission is enabled; that is, the transmitter portion of the interface circuit 11 is permitted to transmit if and when it receives a signal from the cell 17 through the digital transceiver 12.

CIRCUIT FOR IMPLEMENTING A PORTION OF THE PRESENT INVENTION

Figure 2:
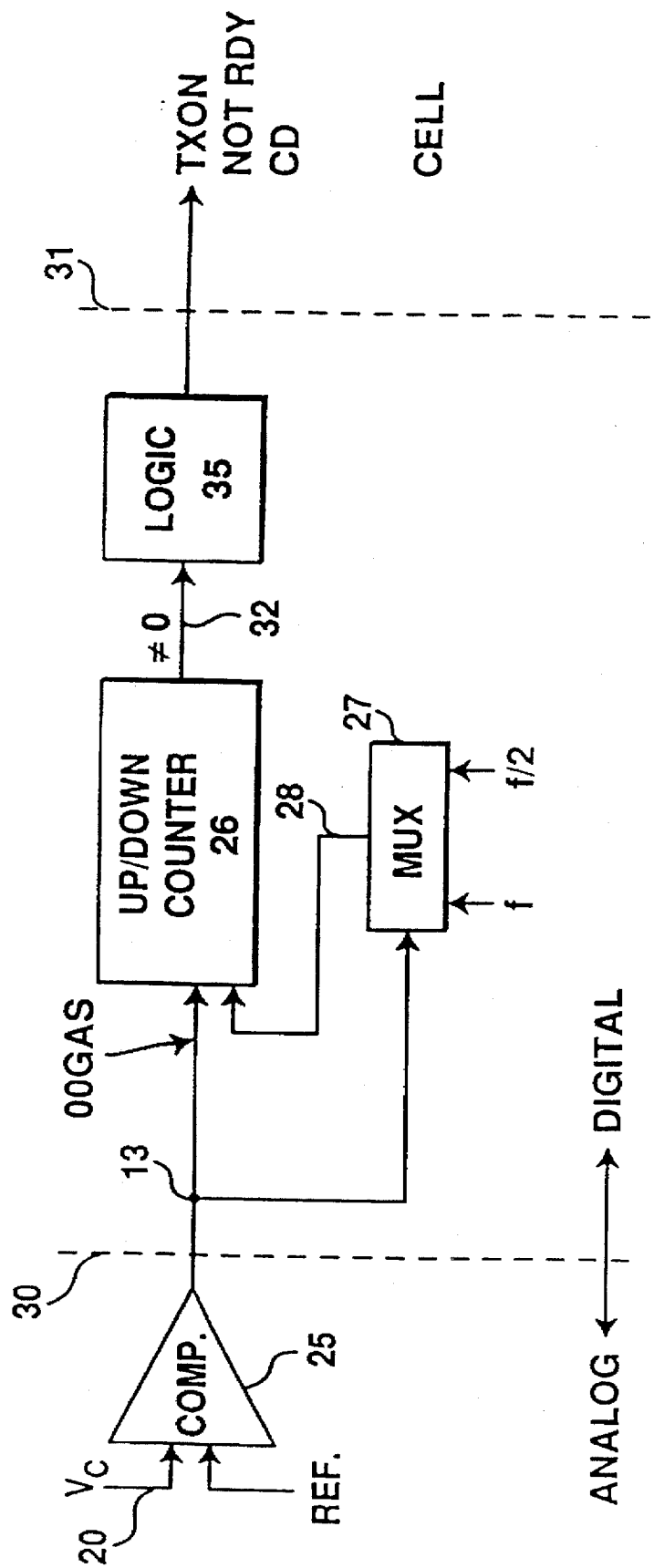
FIG. 2 is a block diagram of the circuit elements used to implement the present invention for one embodiment.

Referring now to FIG. 2, part of the circuitry for implementing the present invention is integrated into interface circuit 11 and part of it is integrated into the transceiver 12. The portion of the circuit in the analog interface circuit 11 is shown to the left of the dotted line 30, the portion of the circuit implemented as part of the transceiver 12 is shown between the dotted lines 30 and 31.

Within interface circuit 11, a comparator 25 compares the potential on line 20, (the potential on the capacitor 15) with a reference potential. This reference is selected so that the output of the comparator 25 goes high if Vc drops to Vmin. For the example under consideration Vmin is 8 volts. The output of the comparator 13 is the OOGAS signal which is coupled over line 13 from the interface circuit 11 to the transceiver 12. The comparator 25 includes hysteresis such that the output of the comparator 25 drops in potential (inactive state) when Vc reaches a potential between Vmin and Vmax. For the example under consideration this potential is 12 volts. Thus, OOGAS goes active when Vc is at or below 8 volts and remains active until Vc is charged to 12 volts.

A digital counter 26 is included on the transceiver 12. Initially, the count in counter 26 is 0. (As will be discussed, up/down counting is controlled by OOGAS signal.) The counter increments or decrements at a rate determined by the signal on line 28. This rate is either f or f/2. One of these timing signals is selected by the multiplexer 27 under control of the OOGAS signal. When the OOGAS signal is high, the frequency f is selected by the multiplexer 27 and consequently the counter 26 counts at the rate f. Similarly, when the OOGAS signal is low, the multiplexer 27 selects f/2 and the counter 26 counts at that rate. Anytime the counter 26 has a count other than 0, a signal is provided on line 32 to the logic circuit 35. This circuit combines the counter output with other signals (e.g., timing) to provide the TXON, NOT RDY, and CD signals. Thus one output of logic circuit 35 is used to prevent transmissions from the interface circuit 11 through the TXON signal which enables transmissions by the interface circuit 11. Transmissions are prevented when the signal on line 19 is low. Another output of the circuit 35 is sent (via the interface between cell 17 and transceiver 12) to the cell 17 as the "NOT RDY" indication to prevent the cell 17 from sending a data packet to the transceiver 12. Another output of the circuit 35 is sent (via the interface between cell 17 and transceiver 12) to the cell 17 as the "CD" indication to indicate that a transmission was aborted before completion. As mentioned, the interface between transceiver 12 and cell 17 as used in one embodiment of the invention is described in U.S. Pat. No. 5,182,746.

An active OOGAS signal on line 13 causes the counter 26 to increment at the rate of the timing signal on line 28 (f). When the signal on line 13 is low, counter 26 decrements at the rate of a signal on line 28 (f/2) until the counter reaches the count of 0. Once the counter 26 reaches 0 it remains at 0 until OOGAS becomes active. Thus, when the comparator 25 detects Vmin, OOGAS becomes active, and the counter 26 begins counting up at the rate f. When Vc=12V for the example under consideration, OOGAS goes inactive and the counter counts down at the rate of f/2. Thus, if 100 msecs was required for the capacitor to charge from 8 volts to 12 volts, the signal on line 32 would remain high for an additional 200 msecs since the counter in counter 26 will take twice as long to decrement to 0 at the rate f/2.

Generally when Vmin is detected the interface circuit 11 will be transmitting, otherwise the capacitor 15 would not be discharging. More likely than not, a transmission by the interface circuit 11 will be interrupted when Vmin is detected and the signal on line 19 drops causing the interface circuit 11 to cease transmitting. (It is possible, however, that Vmin will be reached at the very end of a transmission.)

For the circuit of FIG. 1, a mechanism is provided to assure that the interrupted data packet is retransmitted. The transceiver includes a mechanism for detecting a collision between a data packet being transmitted and a data packet on the power line. When a collision is detected the cell 17 is notified of the collision and at a later time retransmits the message. A signal "CD" indicating a collision detection is sent from the transceiver 12 to the cell 17 over the interface previously discussed.

The CD signal is also used to cause data packets that were interrupted by Vc=Vmin being detected to be retransmitted when Vc recovers. Thus, CD is transmitted by the transceiver 12 to the cell 17 when the interface circuit 11 is interrupted from transmitting a complete packet. The cell, in effect, is made to believe that a collision has occurred and therefore it attempts to retransmit the data packet. The NOT RDY signal provided by the transceiver 12 to the cell 17 prevents the retransmission until such time as the capacitor is sufficiently charged.

DIAGRAMS ILLUSTRATING PERFORMANCE

Figure 3:
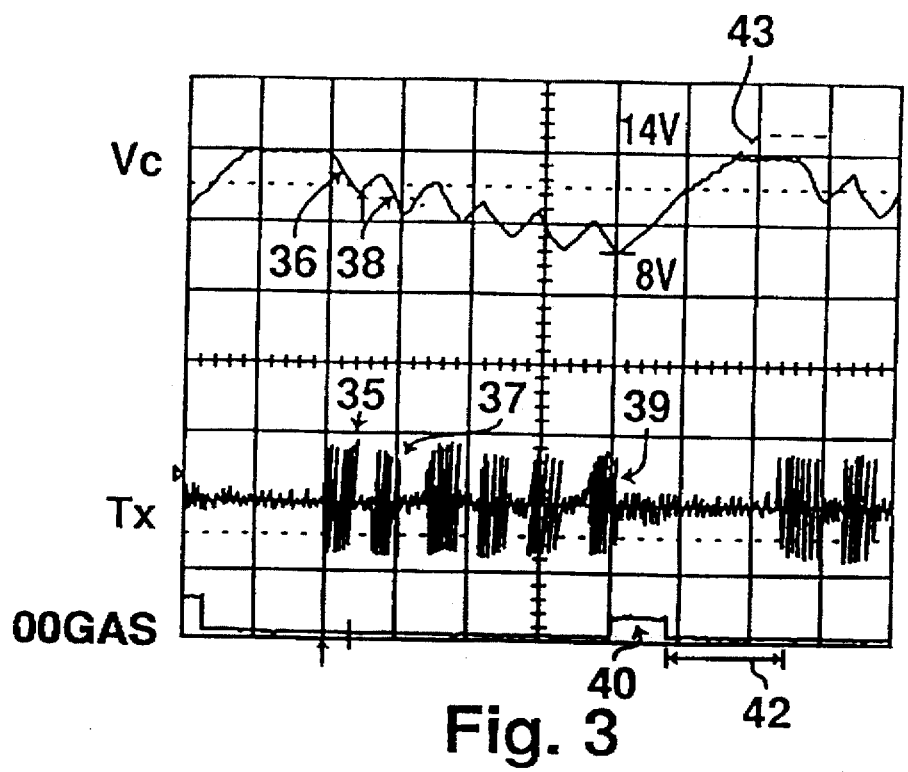
FIG. 3 shows on a time axis waveforms representing: the potential on a power supply capacitor, transmissions by a transmitter and a control signal used in the present invention for a first set of operating conditions.

In FIG. 3 the upper waveform represents the voltage Vc on the capacitor 15 of FIG. 1. For this figure as well as FIGS. 4-5, it is assumed that the output of the power supply 16 is 14 volts; that is, a condition where the voltage tolerance is low, preventing the capacitor 15 from reaching a fully charged state. Vmin is assumed to be 8 volts. The middle waveform labeled "TX" represents the transmissions from the interface circuit 11 of FIG. 1. Several packets are shown along the time axis such as packets 35, 37 and 39. The lower waveform represents the OOGAS signal. This signal is shown active or high at pulse 40.

The drop in Vc shown by segment 36 occurs during the transmission of the packet 35. At the end of the transmission of packet 35 there is a rise in Vc as the capacitor is partly recharged from the power supply. When transmission begins for packet 37 there is again a drop in Vc shown by the segment 38 of the Vc waveform. Again there is a rise in potential following the end of the transmission of packet 37 since the transmitter is off. Four additional packets of data are transmitted, the last of which is packet 39. During the transmission of each of these packets there is a drop in the potential Vc followed by a rise in potential between the transmissions. In general, as can be seen in FIG. 3, the packet transmissions are occurring at a fast enough rate to reduce the overall charge on the capacitor. During packet 39 or at the end of packet 39, Vc drops to 8 volts causing the OOGAS signal to rise in potential as shown by pulse 40.

OOGAS remains high until the Vc signal charges to approximately 12 volts for the example discussed above. Transmission is inhibited for an additional period corresponding to period 42 which is twice the duration of the pulse 40 for the embodiment discussed above. Before the end of the period 42 the potential on Vc rises to 14 volts, which corresponds to the maximum output from the power supply for the conditions under discussion. At the end of period 42 the "NOT RDY" indication transmitted to cell 17 becomes inactive thereby allowing cell 17 to transmit through the transceiver 12 and interface circuit 11 while the TXON signal on line 19 enables the transmit circuitry of the analog interface. For the example of FIG. 3, if the output of the power supply were equal to 16 volts then during the period 42 the potential Vc would climb to 16 volts as shown by the dotted line 43.

Figure 4:
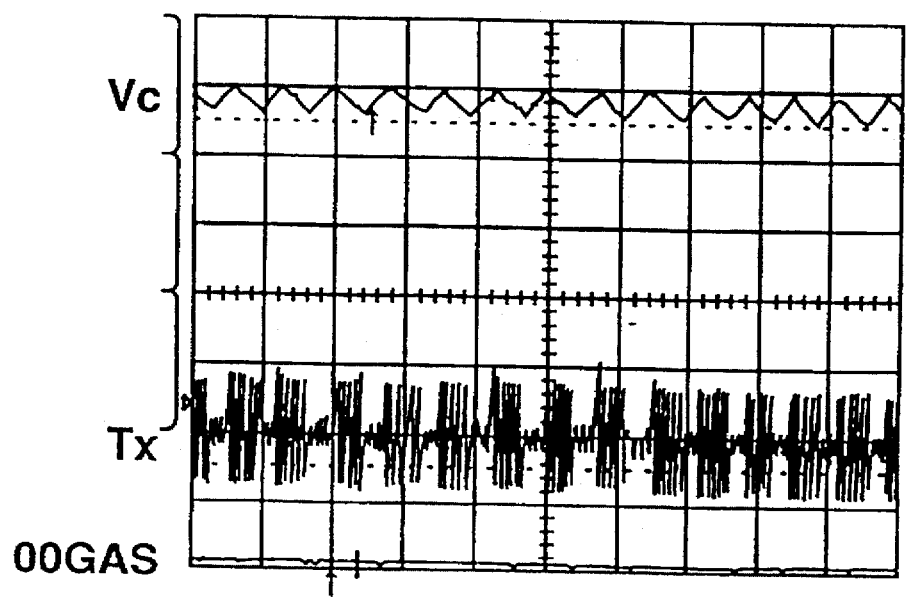
FIG. 4 shows on a time axis waveforms representing: the potential on a power supply capacitor, transmissions by a transmitter and a control signal used in the present invention for a second set of operating conditions.

FIG. 4 shows another example where a plurality of transmissions occur. During each transmission Vc drops as charge is removed from the capacitor to power the transmitter of interface circuit 11. After the transmission and before another transmission begins, the capacitor is charged to its initial voltage as shown. For this example, the duty cycle of the transmitter and the load presented by the transmitter on the capacitor is not great enough to discharge the capacitor to Vmin. Thus OOGAS never become active since Vc remains well above Vmin.

Figure 5:
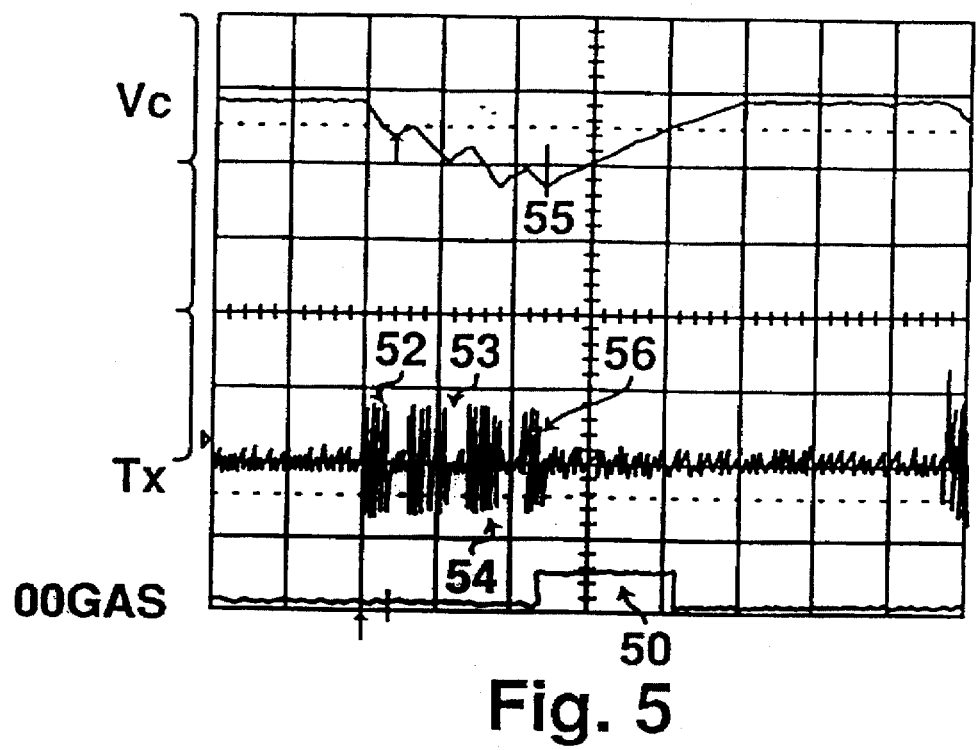
FIG. 5 shows on a time axis waveforms representing: the potential on a power supply capacitor, transmissions by a transmitter and a control signal used in the present invention for a third set of operating conditions.

In the example of FIG. 5, Vc decreases for data packets 52, 53 and 54. There is insufficient recharging between these packets to maintain Vc at a constant level. During packet 56, as indicated by time 55, Vc reaches Vmin and OOGAS rises as shown by pulse 50. Transmissions are resumed after a period corresponding to three times the period of the pulse 50 following time 55.

Figure 6:
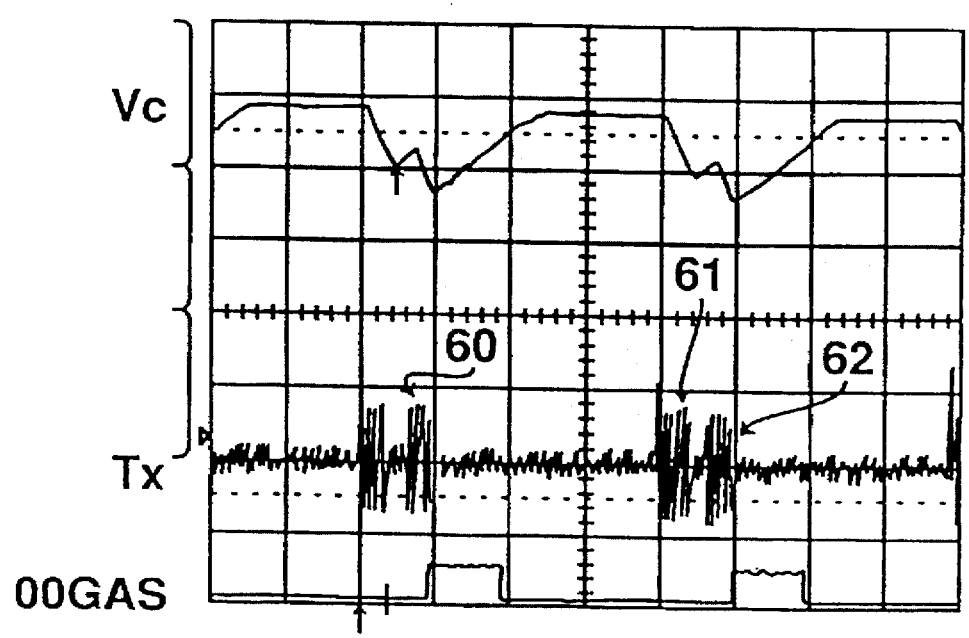
FIG. 6 shows on a time axis waveforms representing: the potential on a power supply capacitor, transmissions by a transmitter and a control signal used in the present invention for a fourth set of conditions.

In FIG. 6 a somewhat worse case is shown where every other packet is interrupted. For instance, packet 60 is interrupted, packet 61 is successfully transmitted and then packet 62 is interrupted.

OVERVIEW OF THE DC POWER SUPPLY OF THE PRESENT INVENTION

Referring first to FIG. 8, a power line 104 is shown which, in most applications, is an alternating current power line having a "hot" line and a neutral line. Most often in the United States this is 110V, 60 Hz power line. An incandescent lamp 105 (or other load) is connected to the power line through a switch shown as a triac 106. The triac 106 is coupled to the neutral power line through an inductor 108.

The problem which arises is when power is needed at node 121. This power, as mentioned, may be required in the junction box which includes a switch or dimmer to, for example, power an intelligent cell which controls the triac 106 and which communicates over the power line 104. Such cells are disclosed in, for example, U.S. Pat. No. 4,918,690.

As can be readily seen from FIG. 8, if too much current is drawn at node 121 when the triac 106 is not conducting, the lamp 105 may have a noticeable glow, especially in the dark. When the triac 106 is conducting, node 121 is substantially at neutral (or ground) making it difficult to obtain power from the node without transformer coupling and making it difficult to transmit from transmitter 117 onto the power line or receive from receiver 118 communication signals present on the power line.

When the lamp 105 is on, its resistance is relatively high, particularly when compared to the power line impedance. Consequently, the transmission of a signal from the transmitter 117 over the power line is made more difficult. An additional problem is that transmission from the transmitter 117 must occur not only when the lamp is on but also when the lamp is off (making its impedance relatively low). Thus there is an impedance matching problem.

With the present invention the AC potential from node 121 is rectified by a diode bridge 102. The output of the bridge 102 is coupled through a switch 103 to an inductor 100. The inductor is coupled to the node 120 through a current shunt 119. Charge is stored at node 120 on the capacitor 101 which is coupled between node 120 and circuit ground. This capacitor corresponds to capacitor 15 of FIG. 1.

The voltage regulator 113 is powered from node 120 and is used, for example, to power the cell. As is apparent from FIG. 8, when switch 103 is closed, a positive potential is applied to the capacitor 101 through the inductor 100. At the beginning of each AC half cycle (shown as area 165 of the waveform 161 of FIG. 10) a current is induced in the inductor 100 and the inductor 100 thereby stores energy while the capacitor 101 is charged. When the switch 103 is opened current flows through the diode 112 and inductor 100 continuing charging of the capacitor 101.

The control circuit 110 senses the current in the inductor 100 through the shunt 119 and also senses the voltage on the capacitor 101. The control circuit 110 closes the switch 103 at the beginning of each AC cycle and then opens the switch 103 when either the current in the inductor reaches a predetermined level or when the voltage on capacitor 101 reaches a predetermined voltage.

The control circuit 110 also provides an output signal to the AND gate 111. The other terminal of AND gate 111 receives a dimmer control signal. This signal controls the intensity of the light from lamp 105 by controlling when the triac 106 begins conducting in each AC half cycle as is well known in the art. The dimmer control signal may be developed from a manual control or may be provided from the intelligent cell discussed above. For purposes below it is assumed that whenever a positive potential is present on the dimmer control line, the triac 106 will conduct. However, if a zero potential is applied to the AND gate 111 from the control circuit 110 the triac 106 will not conduct. With the present invention, when the switch 103 is closed, the control circuit 110 assures that the triac 106 is not conducting by providing a zero signal to the gate 111.

During the beginning of each AC half cycle, the lamp 105 is kept off for a very short period of time and during this time energy is stored in the inductor 100 while the capacitor is partly charged. This energy is used to continue to charge capacitor 101 after the inductor is uncoupled from the power line.

ELECTRICAL SCHEMATIC OF FIG. 9

In FIG. 9 the node 148 is coupled to a rectifying bridge, such as the bridge 102 of FIG. 8. Node 148 is coupled to the emitter terminal of a pnp transistor 125. This transistor performs the function of the switch 103 of FIG. 8 by selectively switching current between its emitter and collector. The inductor 100, capacitor 101 and diode 112 of FIG. 8 are again shown in FIG. 9. The node 120 provides power directly to the transmitter in one embodiment and also to the regulator 113.

The control circuit 110 of FIG. 8 is realized in FIG. 9 as a flip-flop 128. The Q output of the flip-flop 128 provides the signal for controlling the transistor 125. More specifically, this terminal is coupled to the base of the npn transistor 127 through a resistor 147. The base of transistor 125 is coupled through the resistor 146 to the collector of transistor 127. The emitter of transistor 127 is coupled to ground. The base of the transistor 125 is also coupled to the emitter of this transistor through the resistor 135. As is apparent, when the Q terminal of the flip-flop 128 is high, transistor 127 conducts thereby causing transistor 125 to conduct. This couples the inductor 100 to the power line.

Current is sensed through the inductor 100 by noting the voltage drop across the resistor 145. This resistor is coupled to the emitter of the pnp transistor 126. The base of this transistor is coupled to node 120 through the resistor 143. The collector of this transistor is coupled to the base of an npn transistor 129 through a resistor 140. The potential on the collector on the transistor 129 is coupled to the reset terminal of the flip-flop 128. Current through resistor 145, as sensed by transistor 126, causes transistor 129 to conduct thereby providing a reset signal to flip-flop 128. When the current in the inductor 100 reaches approximately 0.45 amps in the embodiment of FIG. 9, reset occurs. Also, the voltage on the node 120 is sensed by transistor 129 through the zener diode 141 and resistor 142. Zener diode 141 is coupled to the base of transistor 129 through resistor 140. In the embodiment of FIG. 8, when the voltage on capacitor 101 exceeds 15.7 volts transistor 129 conducts and a reset signal is transmitted to the flip-flop 128. Thus, either the current of 0.45 amps in the inductor 100 or the voltage of 15.7 volts on node 120 will reset the flip-flop 128.

Power is provided for the circuit of FIG. 9 initially from node 148 through the resistor 134 and diode 131. Zener diode 132 clamps node 149 to approximately 5V which is stored on capacitor 133. Subsequently, power is obtained from the regulator 113 through the diode 130 which provides regulated power to node 149 once capacitor 101 is charged. Node 149 is coupled to the flip-flop 128 and to the collector of transistor 129 through resistor 150.

The rectified AC signal from node 148 is coupled through the capacitor 136 and resistor 151 to the parallel combination of capacitor 137, resistor 138 and the zener diode 139. These components provide a zero crossing detector with an output shown on line 162 of FIG. 10 to the clock terminal of the flip-flop 128. Each time there is a zero crossing of the potential on the power line, there is a rising edge provided to the flip-flop 128.

Figure 10:
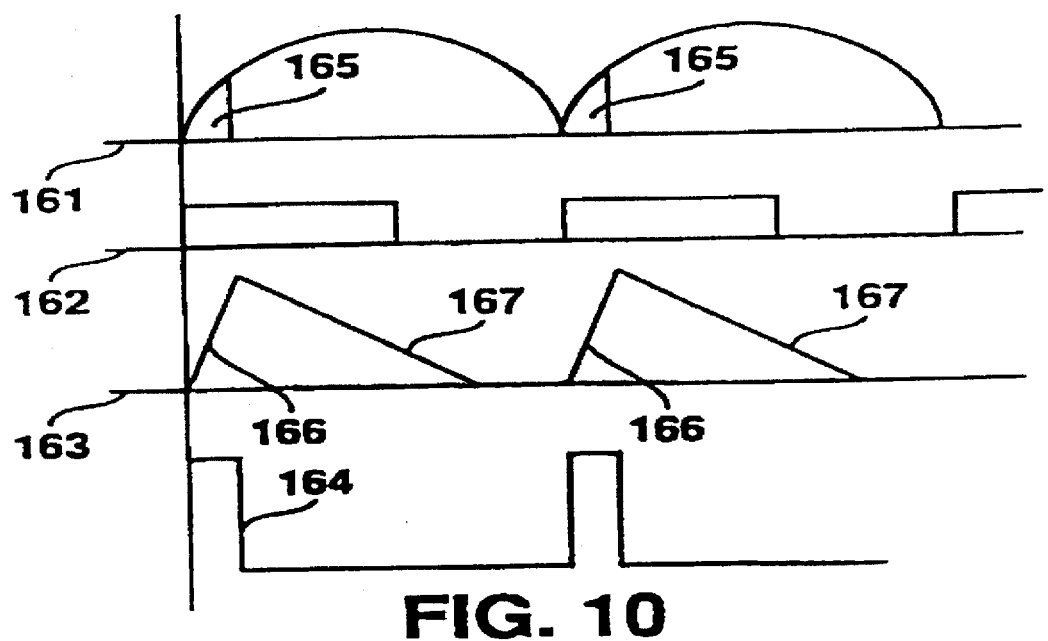
FIG. 10 illustrates a plurality of waveforms used to describe the operation of the circuit of FIGS. 8 and 9.

Referring to FIG. 10, the potential on the node 148 is shown as a rectified signal, waveform 161. On the rising edge of the clock signal (waveform 162) the flip-flop is set high because the potential on the D terminal of the flip-flop 128 is high. This causes the Q output of the flip-flop to be high and as mentioned, closes the switch provided by transistor 125. For a short period of time thereafter, shown by the area 165 in FIG. 10, the current in the inductor 100 (FIG. 9) builds up. The current builds up relatively quickly as shown by the steep leading edges 166 of the waveform 163. When the current in the inductor 100 reaches a predetermined level (0.45 amps for the embodiment under discussion) or when the potential on node 120 reaches 15.7 volts, transistor 129 conducts and the 0 volts from the collector of transistor 129 is transmitted to the reset terminal of the flip-flop 128. This causes the flip-flop 128 to reset thereby dropping the potential at the output of a flip-flop (see pulse 164 of FIG. 10 representing the output of the flip-flop 128). This in turn causes the transistor 125 to cease conducting.

The transistor 125 remains off until the next half cycle when the clock signal transitions from low to high (waveform 162) which causes the flip-flop 128 to be set with its output high. During the time that transistor 125 is not conducting, the energy stored in the inductor 100 charges capacitor 101, this is shown by the slope 167 of the waveform 163. In a typical application, the time defining the area 165 is approximately 0.5 msecs of the complete half cycle of approximately 8.3 msecs. Thus, even though during this period of approximately 0.5 msecs current is prevented from flowing through the switched leg, it is a relatively short period and represents only a fraction of the total power that can be delivered to the bulb.

In FIG. 9 the AND gate 111 of FIG. 1 is not used but rather, a signal from the output of the flip-flop 128 is sent to the intelligent cell and the cell prevents a dimmer control signal from activating the triac 106 of FIG. 8 when transistor 125 is conducting.

SPECIFIC COMPONENTS USED IN THE EMBODIMENT OF FIG. 9

The following represents the specific values and parts used in the embodiment of FIG. 9.

| Resistors | Value (ohms) |
|---|---|
| 134 | 100K |
| 135 | 1K |
| 138 | 50K |
| 140 | 1K |
| 142 | 1K |
| 143 | 1K |
| 145 | 1.5 |
| 146 | 2.5K |
| 147 | 5K |
| 150 | 100K |
| 151 | 100K |

| Capacitors | Value (µF) |
|---|---|
| 101 | 3300 |
| 133 | 0.1 |
| 136 | .01 |
| 137 | .01 |

| Inductor | Value |
|---|---|
| 100 | 270 mH |

| Diodes | Part No./Voltage |
|---|---|
| 112 | 1N4004 |
| 130 | 1N4148 |
| 131 | 1N4148 |
| 132 | 5.1 V |
| 139 | 5.1 V |
| 141 | 15 V |

| Transistors | Part No. |
|---|---|
| 125 | FZT796 |
| 126 | 2N3906 |
| 129 | 2N3904 |
| 127 | MPSA42 |

DATA TRANSMISSION ONTO THE POWER LINE THROUGH THE SWITCHED LEG

In one embodiment, data from the intelligent cell is communicated onto the power line at node 121 from the transmitter 117. By way of example, the data is transmitted at a frequency of approximately 132 kHz. A number of problems arise when transmitting data through the switched leg. One problem is that when the triac 106 is closed there is essentially a path to ground or the neutral from the transmitter 117. Additionally, the resistance of the lamp 105 is typically relatively low when the lamp is off and then rises as current flows through the lamp, and the resistance of the lamp particularly in the on state is relatively high when compared to the impedance of the power line 104. Thus much of the signal intended to be transmitted on the power line may be lost through the lamp.

The inductor 108 and capacitor 107, as can be seen in FIG. 8, are coupled in parallel between the triac 106 and the neutral. These components are selected so that they have substantially no impedance at 60 cycle and infinite impedance at 132 kHz. When the triac 106 is conducting and the transmitter 117 is transmitting, there is in essence an open circuit between node 121 and the neutral of the power line insofar as the 132 kHz signal is concerned.

The change in impedance at the output of the transmitter 117 that occurs when the triac 106 begins conducting can be compensated for in a number of ways. The intelligent cell controls the conducting of the triac 106 and consequently it is known when the impedance will change. Another approach is to use two different output stages in the transmitter 117. For example, if it is known that the bulb when off, has a resistance of 10 ohms and a resistance of 400 ohms when on, the output stages can compensate for this. One shortcoming to this approach is that the lamp resistance will vary depending upon the size of the bulb.

Figure 11:
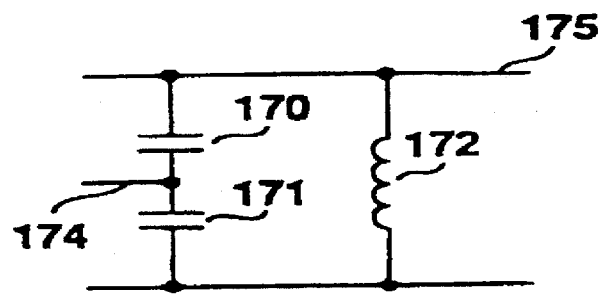
FIG. 11 illustrates alternate coupling for coupling a transmitter to a switched leg.

Passive networks can be used to provide adaptive impedance matching. One simple approach is shown in FIG. 8 using the inductor 115 and the capacitor 116 at the output of the transmitter 117. This simple LC network provides matching when LC is approximately equal to 132 kHz. Changing 116 to an inductor and 115 to a capacitor will also work. Another passive network for performing the same function is shown in FIG. 11. The transmitter is coupled to the line 174. The output signal is transmitted across the inductor 172 through the capacitors 170 and 171. The output 175 is coupled to the node 121 of FIG. 8. Generally, the capacitor 171 has substantially more capacitance than capacitor 170 and thus the network provides a higher output voltage as the resistance on line 175 increases. Changing 170 and 171 to inductors and 172 to a capacitor will also work.

Figure 12:
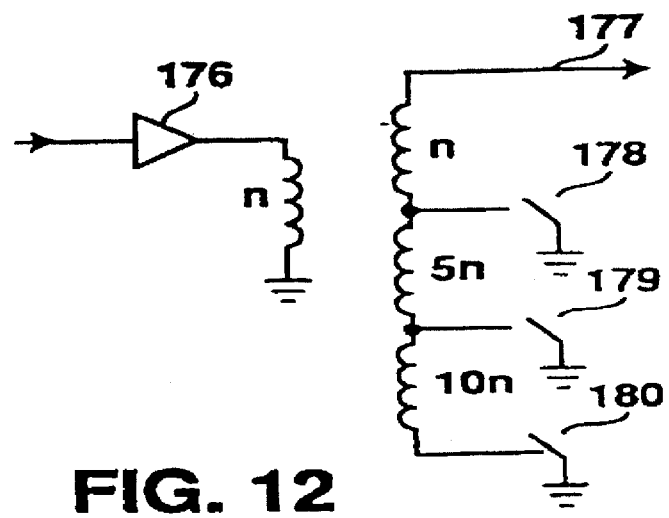
FIG. 12 illustrates yet another coupling for coupling a transmitter to a switched leg.

Another approach to solve this problem is shown in FIG. 12 where the transmitter 176 is coupled to the primary winding of a transformer having n turns. The secondary of the transformer has several selectable windings, specifically, n when switch 178 is closed, 6n when switch 179 is closed, and 16n when switch 180 is closed. Thus, the output voltage on line 177 may be controlled by selectively closing the switches 178 through 180. The appropriate switch may be closed as a function of the bulb resistance. Again, since the intelligent cell knows when the triac 106 will conduct part of the information needed for controlling switching is available. The current through the triac may be measured to provide additional information needed to select an appropriate switch.

Another problem is that when switch 106 is opened or closed a large transient followed by ringing in combinations of inductors and capacitors can impair receiver 118 from properly receiving a communication signal. One solution is to use active damping where, for instance, a low value resistance can be momentarily switched in, for example, across capacitor 107 or capacitor 122 to damp ringing.

Thus, a power supply has been described which receives power from a switched leg and provides power to a transmitter.

We claim:

1. An apparatus for powering a transmitter from a switched leg of an AC power line where the switched leg is switched by a first switch, comprising:

a capacitor coupled to supply power to the transmitter;

a first circuit for sensing the potential on the capacitor and for inhibiting transmission from the transmitter when a potential on the capacitor falls below a predetermined potential;

a second switch for periodically coupling power from the power line for charging the capacitor; and, a second circuit for controlling the first switch such that the switched leg is open when the second switch is coupling power from the power line and for opening the first switch in the beginning of an AC power line cycle.

2. The apparatus defined by claim 1 including an inductor coupled to the capacitor and the second switch for receiving energy from the AC power line when the second switch is closed and for providing a current to the capacitor when the second switch is opened.

3. A method for operating a transmitter which requires a direct current (DC) of $I_T$ when transmitting from a DC power supply where the supply receives power from an AC switched leg comprising the steps of:

providing a power supply which provides the DC current less than $I_T$;

charging a capacitor in the power supply from the switched leg by coupling the capacitor to the switched leg only when current is not flowing in the switched leg and during the beginning of an AC power line cycle;

inhibiting transmissions by the transmitter when the voltage on the capacitor is too low (Vmin) to enable transmissions by the transmitter; and enabling transmissions by the transmitter when a voltage on the capacitor is high enough to permit transmission by the transmitter.

4. The method defined by claim 3 wherein the power supply charges the capacitor to a maximum potential of Vmax and where the enabling step permits transmission when the voltage on the capacitor is between Vmin and Vmax.

5. The method defined by claim 3 wherein the transmitter transmits data packets and the additional step of transmitting a data packet, the transmission of which was interrupted by the inhibiting step.

* * * * *